June 10, 1969          B. M. PETERS          3,448,812
AUXILIARY WHEEL UNIT FOR A LAWN EDGER
Filed Dec. 27, 1966
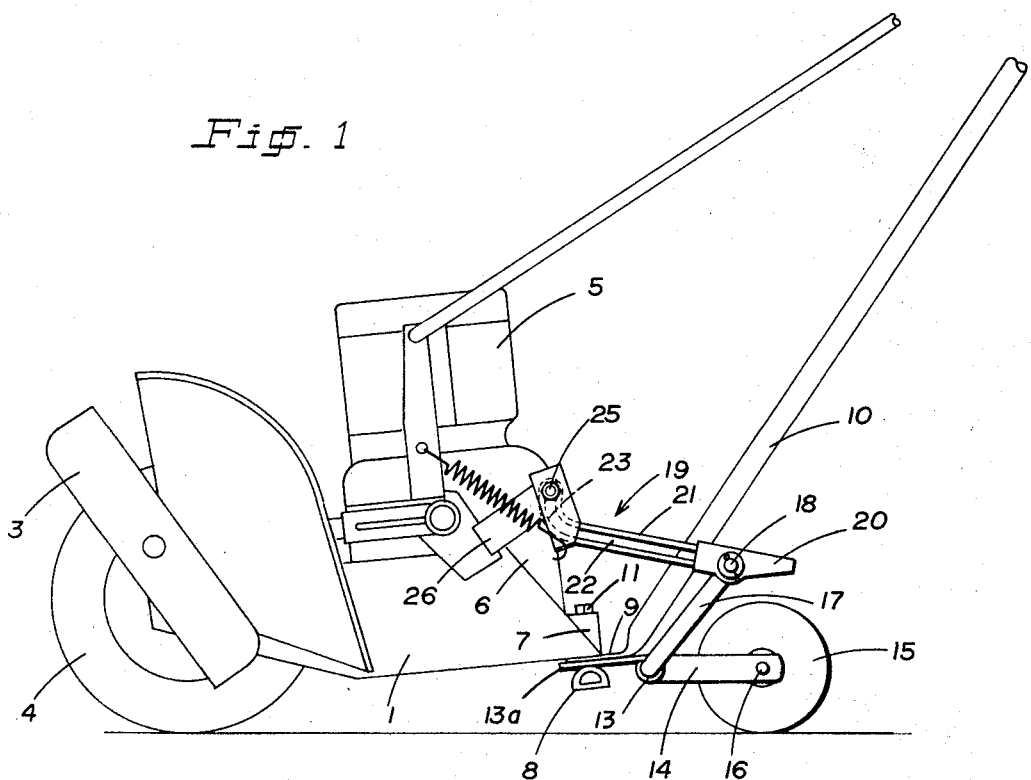
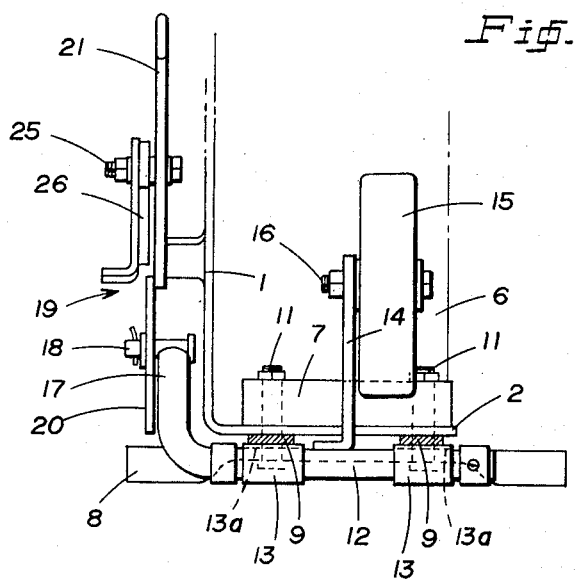
INVENTOR.
Byron M. Peters United States Patent Office 3,448,812
Patented June 10, 1969

1

3,448,812
AUXILIARY WHEEL UNIT FOR A LAWN EDGER
Byron M. Peters, Lathrop, Calif., assignor to Ampex Corporation, Redwood City, Calif., a corporation of California
Filed Dec. 27, 1966, Ser. No. 605,021
Int. Cl. A01b 45/04, 33/10, 45/00
U.S. Cl. 172—15                                    4 Claims

ABSTRACT OF THE DISCLOSURE

An auxiliary device, preferably in the form of an attachment, which provides—for selective use—an additional supporting wheel for a power-type, single-wheel lawn edger.

Background of the invention

Power-type, single-wheel lawn edgers, such as shown in my United States Patent No. 3,168,147, require the operator to manually sustain—by means of the handle bars—a substantial part of the weight of the edger and at times, as when edging long stretches of lawn, this becomes most tiring. The present invention is directed to a solution of such problem.

Summary of the invention

The present invention provides, as its major object, an auxiliary wheel unit adapted to be mounted on a power-type, single-wheel lawn edger; such auxiliary wheel unit being operative in use to relieve the operator of all but a minimum of the weight of the edger. While essentially serving as an exertion-saving aid to the operator, said auxiliary wheel unit causes the edger to track better on straight stretches of lawn and with less manual guidance.

The present invention provides, as an additional object, an auxiliary wheel unit which, when mounted on a power-type, single-wheel lawn edger, can be readily and conveniently moved by the operator from a lowered, ground-engaging position for use, to a raised aboveground position out of use; the unit being disposed in such out-of-use position when the edger is employed for edging a short stretch or a curved stretch of lawn and at which time only single-wheel ground support is desired for ease of manipulation.

The present invention provides, as another object, an auxiliary wheel unit, for the purpose described, which comprises a transverse axle turnably mounted on the edger at its rear end, an arm projecting radially from the axle on which the auxiliary wheel is mounted, and manually operable means between the axle and the edge to control the rotation of the axle so as to dispose and hold said wheel in contact with the ground, or to dispose and hold such wheel clear of the ground, selectively.

The present invention provides, as a further object, an auxiliary wheel unit which is designed for ease and economy of manufacture, ready installation, and simplicity of use.

The present invention provides, as a still further object, a practical, reliable, and durable auxiliary wheel unit and one which is exceedingly effective for, the purpose for which it is designed.

Brief description of the drawings

FIG. 1 is a side outline of a power-type, single-wheel lawn edger as equipped with the auxiliary wheel unit; the latter being shown in its operating position.

FIG. 5 is an enlarged fragmentary rear end view showing the auxiliary wheel unit in the position occupied thereby in FIG. 4.

Description of the preferred embodiment

Figure 2:
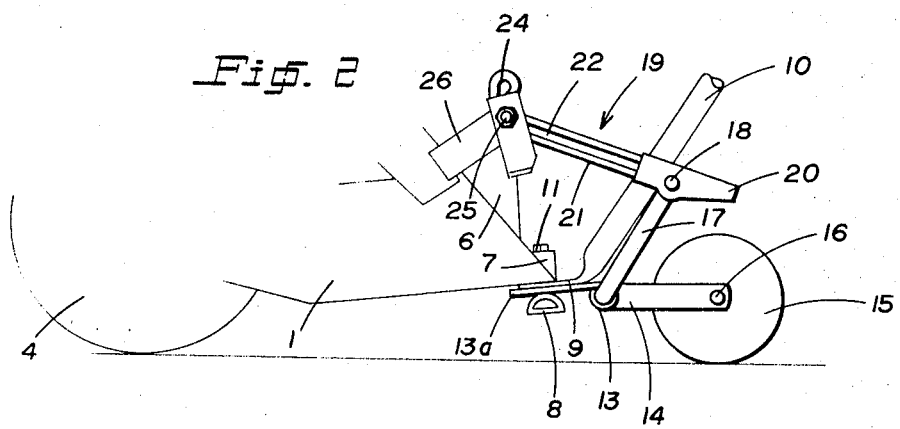
FIG. 2 is a fragmentary side outline of the lawn edger with the auxiliary wheel unit in the position thereof occupied immediately after being released from its operative ground-engaging position.

Referring now more particularly to the drawings and to the characters of reference marked thereon, the illustrated power-type, single-wheel lawn edger (which is substantially the same as in United States Patent No. 3,168,-147) embodies a rigid frame which includes a vertical side plate 1 having tranverse bottom plate 2 which projects laterally to the right and extends to the rear end of the plate 1. The vertical, transverse axis, power driven rotary edger blade 3 is disposed on the left side of the plate 1, while the single ground-engaging wheel 4 is disposed on the right side of the plate 1 opposite the edger blade and is supported from said plate 1 adjacent its forward end.

The engine 5 which drives the edger blade 3 is on the same side of the plate 1 as the wheel 4, and includes a crankcase 6 supported on the bottom plate 2; the crankcase having a transverse member 7 at its rear end bearing on said plate 2. A transverse ground-engaging tilt-preventing bar 8 (used when the edger is standing idle) extends under the plate 2 and member 7; the flattened lower ends 9 of upstanding transversely spaced handle bars 10 projecting between the bottom plate 2 and the bar 8 and being clamped against movement by bolts 11 which project upwardly through the bar 8, the ends 9, the plate 2 and the member 7. The foregoing are all standard parts of the edger and are not changed in any way.

The auxiliary wheel unit comprises a transverse axle 12 mounted in a pair of laterally spaced bearing sleeves 13 provided with tangential forwardly projecting ears 13a which, when the unit is mounted in place, project between the handle bar ends 9 and the bar 8; the ears 13a being drilled to receive the bolts 11 therethrough in securing relation. The axle is thus disposed a short distance back from the bar 8 but does not project therebelow.

Figure 4:
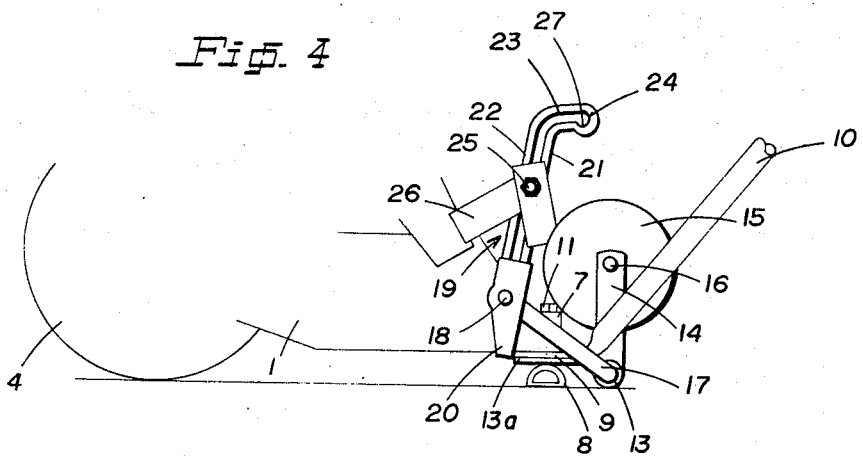
FIG. 4 is a similar view but shows the released auxiliary wheel unit in its fully raised position, clear of the ground.

By reference to the positions of the parts when the edger and auxiliary wheel unit are both in working position as in FIG. 1, a radial arm 14 is rigidly secured to and projects rearwardly from the axle 12 between the sleeves 13, and a ground engageable auxiliary wheel 15 is turnably supported from the right side of said arm 14 adjacent its outer end by means of a spindle 16. A separate radial arm 17 is rigidly secured to the left-hand end of axle 12 and extends at an upward and rearward incline and which is at an angle of approximately 60 degrees from the arm 14; the arm 17 being disposed laterally out from the frame plate 1 a short distance, as shown in FIG. 4.

The outer end of the arm 17 is pivoted, as at 18, on an elongated holding link, indicated generally at 19, which extends substantially horizontally and mainly forwardly from the arm 17. The holding link 19 includes a relatively short rear portion 20 in which, intermediate its ends, the pivot 18 is carried, and a relatively long forward portion 21 which is provided with a full-length slot 22. The rear portion 20 of link 19 is foot-depressible at its back end.

In the main, the slot 22 in the forward portion 21 of holding link 19 is straight and of substantial length, but at the immediate front end thereof said slot curves upwardly at substantially 90 degrees, as at 23.

The slot 22 is closed at its outer end as at 24, and a transverse pin 25—mounted on a bracket 26 rigid with the frame plate 1—projects through the slot 22 and is relatively slidable therein for the full length thereof. The rear sidewall of the slot 22, immediately adjacent the closed end 24 thereof, is notched or recessed, as at 27, to provide a locating or latching point for the pin 25.

With the auxiliary wheel 15 thus mounted, and with the pin 25 seated in the notch 27 adjacent the closed end 24 of the slot 22, said wheel rides on the ground and the edger as a whole, including the tilt preventing bar 8, is held clear of the ground, as shown in FIG. 1. The arm 14, axle 12, and arm 17 form in effect a bellcrank and which—together with the assembly of holding link 19 and pin 25—acts, when said pin is in notch 27, to prevent the edger from turning about the axis of wheel 4 in a direction to lower said edger and thus relatively raise the auxiliary wheel 15. The auxiliary wheel 15 is thus releasably latched in working position, and the edger has wheel support both front and rear; this relieving much of the weight which the operator must otherwise sustain by means of the handle bars 10. This is of particular advantage when edging long stretches of grass.

Figure 3:
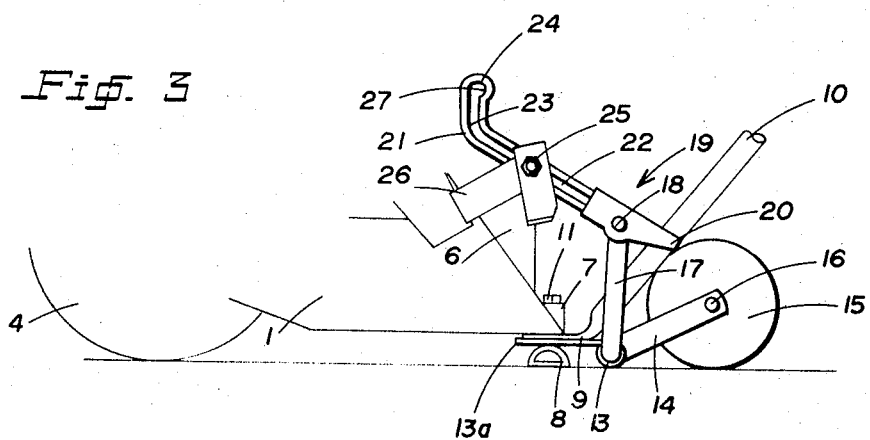
FIG. 3 is a similar view but showss an intermediate position of the released auxiliary wheel unit.

When use of the auxiliary wheel 15 is no longer desired, the operator presses down on the back end of the rear end portion 20 of the link 19 and which swings said link about its pivot 18. This lifts the outer end of the link whereby the pin 25 escapes notch 27 and relatively lowers to the lower end of the curve 23 of the slot 22, as shown in FIG. 2. When this occurs, the weight of the edger functions to cause the same to drop until the bar 8 engages the ground; the wheel 15 then remaining in contact with the ground, but the pin 25 moving toward the rear end of the slot 22, as shown in FIG. 3. A forward movement being then imparted to the back end of the rear end portion 20 of the link 19 (or a forward pull on the upper end of said link) will cause said link to assume a substantially vertical position. In this position of the link 19 the rear end portion 20 thereof is at the bottom, and the wheel-supporting arm 14 is disposed slightly ahead of a dead-center position; the auxiliary wheel 15 then bearing against the rear end of the member 7, as shown in FIG. 4. Such out-of-use position of the wheel 15 is maintained not only by reason of the beyond-dead-center position of the arm 14, but also by virtue of the weight of the link being carried on the then forwardly projecting arm 17.

To reset the auxiliary wheel 15 to its ground-engaging, edger-supporting position, it is only necessary to manually return the link 19 and connected parts to the position of FIG. 3, and to then lift the edger at its rear end a relatively slight distance. The downward pull of the wheel 15 then causes the link 19 to return to its latched position with the pin 25.

To detach the auxiliary wheel unit as a whole from the lawn edger, the pin 25 is first removed from the bracket 26, and then the bolts 11 are loosened and withdrawn. This disengages the transverse bar 8 from the edger, and allows the ears 13a to be pulled out from between the flattened lower ends 9 of the handle bars 10 and said bar 8. The entire auxiliary wheel unit is thus freed from connection with the edger. The bolts 11 are then replaced, to re-clamp the ends 9 between the bar 8 and the bottom plate 2 of the edger frame.

From the foregoing description, it will be readily seen that there has been produced such an auxiliary wheel unit as substantially fulfills the objects of the invention, as set forth herein.

While this specification sets forth in detail the present and preferred construction of the auxiliary wheel unit, still in practice such deviations from such detail may be resorted to as do not form a departure from the spirit of the invention, as defined by the appended claims.

What is claimed is:

1. An auxiliary wheel unit for a lawn edger which includes a longitudinally extending frame, and a ground-engaging wheel on the forward end of the frame; the unit comprising an auxiliary wheel at the rear end of the frame, means mounting said auxiliary wheel in connection with the frame for movement between a raised position clear of the ground and a lowered ground-engaging position with the bottom of said wheel below the rear of said frame, and means connected to the mounting means to releasably maintain the auxiliary wheel in said lowered position; the mounting means including a horizontal transverse axle, means turnably supporting the axle at spaced points from the frame, and an arm rigid with and projecting radially from the axle intermediate the supporting means, the auxiliary wheel being journaled on said arm adjacent the outer end thereof; and the axle-supporting means comprising bearing sleeves, the frame of the edger including a bottom plate, and ears rigid with and projecting forwardly from the sleeves under and removably secured in connection with said bottom plate.

2. An auxiliary wheel unit for a lawn edger which includes a longitudinally extending frame, and a ground-engaging wheel on the forward end of the frame; the unit comprising an auxiliary wheel at the rear end of the frame, means mounting said auxiliary wheel in connection with the frame for movement between a raised position clear of the ground and a lowered ground-engaging position with the bottom of said wheel below the rear of said frame, and means connected to the mounting means to releasably maintain the auxiliary wheel in said lowered position; the mounting means including a horizontal axle turnably supported from the frame, and an arm rigid with and projecting radially from the axle, the auxiliary wheel being journaled on said arm adjacent the outer end thereof; and said means to releasably maintain the auxiliary wheel in lowered position including another arm projecting generally upwardly from the axle, a rigid link pivoted adjacent one end on the upper end of said other arm and extending forwardly when the auxiliary wheel is in said lowered ground-engaging position with said first named arm projecting rearwardly, and a frame-mounted latch member then releasably engaging with the link and preventing relative upward movement of said auxiliary wheel.

3. A unit, as in claim 2, in which the link is formed with a longitudinal slot disposed in a vertical plane and extending to adjacent the forward end of said link, the slot being upwardly curved adjacent to and closed at its outer end; said latch member being a transverse frame-mounted pin projecting through and relatively slidable along the slot but releasably seating in latching relation in the curved portion of the slot when the auxiliary wheel is in its lowered ground-engaging position.

4. A unit, as in claim 2, in which the relationship of the arms to each other, and the length of the link relative to that of said other arm, and the position of the latch pin relative to the axle, is such that when the link is moved to release the latch pin for sliding in the slot and the link then swung to a substantially vertical position, said first named arm swings to a position ahead of vertical dead center.

References Cited

UNITED STATES PATENTS

| | | | |
|---|---|---|---|
| 617,379 | 1/1899 | Wilbur | 172—429 X |
| 749,833 | 1/1904 | Barnhart | 172—354 |
| 913,953 | 3/1909 | Granger | 172—43 |
| 954,792 | 4/1910 | Graham | 172—17 |
| 1,396,683 | 11/1921 | Hall | 172—356 |
| 2,001,921 | 5/1935 | Petteys | 172—17 |
| 2,675,246 | 4/1954 | Arones | 280—43.17 |
| 2,680,945 | 6/1954 | Reed | 56—256 |
| 2,977,740 | 4/1961 | King | 56—25.4 |
| 3,168,147 | 2/1965 | Peters | 172—15 |

ANTONIO F. GUIDA, Primary Examiner.

ALAN E. KOPECKI, Assistant Examiner.

U.S. Cl. X.R.

56—25.4; 172—43

United States Patent Office

CERTIFICATE OF CORRECTION

Patent No. 3,448,812          Dated June 10, 1969

Byron M. Peters

It is certified that error appears in the above-identified patent and that said Letters Patent are hereby corrected as shown below:

In the patent heading, appearing in column 1, delete ", assignor to Ampex Corporation, Redwood City, Calif., a corporation of California"

SIGNED AND
SEALED
MAR 10 1970

(SEAL)
Attest:

Edward M. Fletcher, Jr.
Attesting Officer

WILLIAM E. SCHUYLER, JR.
Commissioner of Patents